(12) United States Patent
Ito

(10) Patent No.: US 6,744,736 B1
(45) Date of Patent: Jun. 1, 2004

(54) LOCAL AREA NETWORK SYSTEM INCLUDING SHARED EQUIPMENT

(75) Inventor: Tomohiro Ito, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/231,113

(22) Filed: Jan. 14, 1999

(30) Foreign Application Priority Data

Jan. 16, 1998 (JP) .......................................... 10-020421

(51) Int. Cl.[7] ................................................ H04J 15/00
(52) U.S. Cl. .................. 370/245; 370/216; 370/395.52; 358/402; 358/442
(58) Field of Search ................................. 370/216, 241, 370/242, 243, 244, 245, 246, 395.52, 250; 358/1.4, 1.14, 1.15, 402, 441, 442, 468; 705/14, 41

(56) References Cited

U.S. PATENT DOCUMENTS 5,625,757 A * 4/1997 Kageyama et al.
6,118,497 A * 9/2000 Pugel ........................... 725/151
6,134,644 A * 10/2000 Mayuzumi et al. ......... 345/705
2001/0016819 A1 * 8/2001 Kolls
2002/0181008 A1 * 12/2002 Nozaki ....................... 358/1.14

FOREIGN PATENT DOCUMENTS

| JP | A-2-172348 | 7/1990 | ........... H04L/12/54 |
| JP | A-5-95355 | 4/1993 | ........... H04L/12/24 |
| JP | A-7-325784 | 12/1995 | ........... H04L/11/08 |

* cited by examiner

Primary Examiner—Dang Ton
Assistant Examiner—Shick Hom
(74) Attorney, Agent, or Firm—Oliff & Berridge, PLC

(57) ABSTRACT

A LAN (Local Area Network) system employs a plurality of terminals and a shared equipment such as an internet facsimile. When an error occurs in the shared equipment, an error message is transmitted from the shared equipment to a predetermined terminal, for example, a maintenance manager's terminal, and when the error is recovered by someone, the shared equipment transmits an error recovery message to the predetermined terminal.

16 Claims, 4 Drawing Sheets

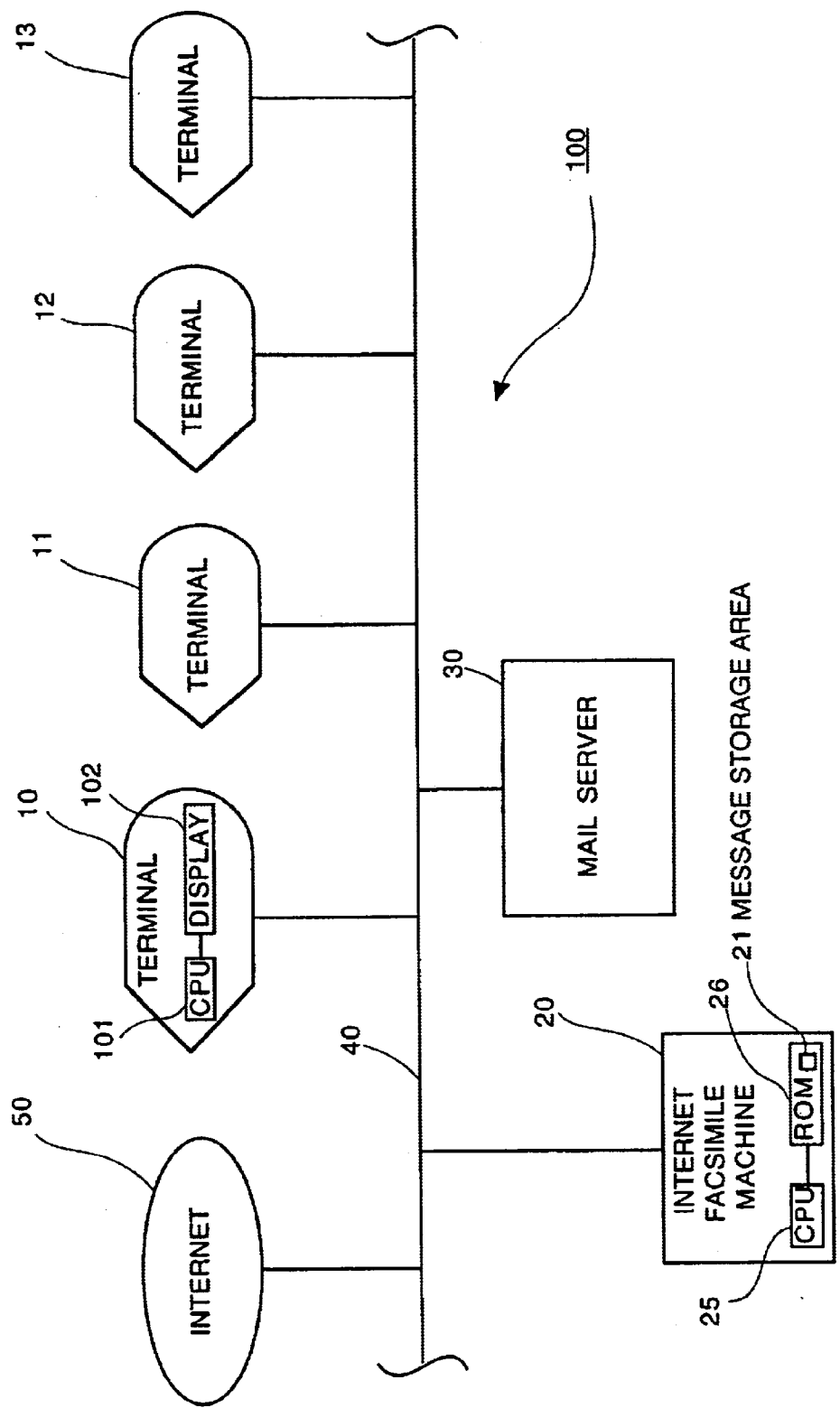

LOCAL AREA NETWORK SYSTEM INCLUDING SHARED EQUIPMENT

BACKGROUND OF THE INVENTION

The present invention relates to a local area network system (referred to as a "LAN system" hereafter), and more particularly, to a LAN system including equipment shared and commonly used by a plurality of user terminals of the LAN system.

Conventionally, there has been known a LAN system employing an internet facsimile machine sharing system, as disclosed in the Japanese Patent Laid-open Publication No. HEI 2-172348, in which a single internet facsimile machine is connected with a plurality of user terminals through a LAN, through which the results of receipt and/or transmission of facsimile messages are notified to respective users by E-mail messages based on receiver identifying data and/or terminal identifying data. Accordingly, in the above-described conventional system, it is unnecessary for respective users to go to the internet facsimile machine to check whether a facsimile message has been received and/or whether a facsimile message was successfully transmitted.

Further, the conventional sharing system is constituted such that, if a trouble occurs in the facsimile machine, an error message is transmitted as an E-mail message to a terminal of a maintenance manager who is responsible for maintenance of the facsimile machine. Since the error conditions are notified by the E-mail messages, it is unnecessary for the maintenance manager to regularly go to the facsimile machine to check whether it is working well. In other words, the maintenance manager is required to go to the facsimile machine only when an error message is transmitted from the internet facsimile machine.

When the error message is transmitted from the facsimile machine to the maintenance manager, however, the maintenance manager may not be able to go to the facsimile machine immediately. In such a case, some other user might go to the facsimile machine to check receipt and/or transmission of a facsimile message, and at that time, the user might restore operation condition of the facsimile machine if the occurred error is an easy one, such as a shortage of paper.

In such a situation, the maintenance manager may go to the facsimile machine in order to recover the noticed error, if the maintenance manager does not know the error has been recovered, and then find that no errors have occurred. That is a waste of time for the maintenance manager, and further, if such a situation occurs again and again, the maintenance manager may tend to regard the error messages as incorrect ones even if the error messages have been transmitted due to actually occurred errors, which reduces reliability of the LAN system.

SUMMARY OF THE INVENTION

It is therefore an object of the present invention to provide a LAN system capable of reducing the above-described problem in the conventional LAN system, and improving the reliability of the system.

For the above object, there is provided a local area network system which includes a plurality of user terminals, at least one shared equipment which is shared by said plurality of user terminals. The plurality of user terminals and at least one shared equipment are interconnected through a local area network. The LAN system is further provided with an error notifying system that notifies occurrence of an error to at least a predetermined one of said user terminals when an error occurs in at least one shared equipment, and an error recovery notifying system that notifies recovery of the error to the predetermined one of user terminals when the error has been recovered after the error notifying system notified the error to the predetermined one of the user terminals.

Since the recovery of the error is notified to the predetermined one of the user terminals (i.e., a maintenance manager's terminal), the problem described above can be solved, and accordingly, the reliability of the LAN system will be improved.

According to another aspect of the invention, there is provided a local area network system including a plurality of user terminals and at least one shared equipment which is shared by the plurality of user terminals. The plurality of user terminals and at least one shared equipment are interconnected through a local area network. The LAN system is further provided with an error notifying system that transmits a first E-mail message indicating occurrence of an error to at least a predetermined one of the user terminals when an error occurs in at least one shared equipment, and an error recovery notifying system that transmits a second E-mail message indicating recovery of the error to the predetermined one of user terminals when the error is recovered after the error notifying system transmitted the first E-mail message to the predetermined user terminal.

Since the occurrence and recovery of an error is notified by E-mail, the user of the predetermined user terminal (e.g., a maintenance manager) can recognize the recovery without going to the shared equipment.

Preferably, the LAN system includes a mail server, and the predetermined one of the user terminals has a mail downloading system that regularly downloads newly arrived E-mail messages from the mail server. Further, the predetermined user terminal may be provided with a display, a first display system which displays an error message indicating occurrence of the error on said display when the first E-mail message is downloaded from the mail server, and a second display system which displays an error recovery message indicating recovery of the error on the display when the second E-mail message is downloaded from the mail server.

With this configuration, management of E-mail messages can be done easily, and the first and second E-mail messages can surely be transmitted to the predetermined user terminal (e.g., the maintenance manager's terminal). Thus, the local area network system saves time for the maintenance manager.

Further, even if the maintenance manager leaves his or her terminal before the second E-mail message is received, he/she can recognize that someone else has recovered the error afterwards, and confirm that the first E-mail message (i.e., an error message) was correct. That improves reliability of the LAN system.

In particular, first display system may display a message window on the display, in which the error message is displayed. Optionally, the second display system may display the error recovery message in the same message window.

With this control, the maintenance manager can easily recognize that what error occurred and then recovered. This is convenient especially when a plurality of errors occurred and part of them have been recovered and the remaining errors are not recovered.

It is preferable that the error message is included in the first E-mail message. Optionally or alternatively, the error recovery message is included in the second E-mail message.

With this configuration, the predetermined terminal device is required to display the message as received, which reduces load to the CPU of the terminal device.

In a particular case, the local area network is connected to the internet, and the shared equipment is an internet facsimile machine which transmits and receives a facsimile message via the internet. In such a case, the internet facsimile machine may be capable of transmitting E-mail messages indicating results of transmission and receipt of facsimile messages to respective terminals, and preferably, the internet facsimile machine is capable of sending first and second E-mail messages.

With this system, since the shared equipment is capable of sending E-mail messages, it can be utilized to send the error messages and/or the error recovery messages.

Preferably, the error notifying system and the error recovery notifying system are provided in the shared equipment.

In this system, since the error messages and/or the error recovery messages are sent by the shared equipment, it can be easily identified by the user of the predetermined user terminal (e.g., the maintenance manager), based on the sender of the E-mail, that the messages are transmitted from the shared equipment and may include the error and/or error recovery messages.

The error notifying system may include an error message generating system that generates an error message in accordance with a type of an error occurred in the shared equipment.

In a particular case, the error message generating system may generate the error message by selecting one message from among a plurality of predetermined messages. Similarly, the error recovery notifying system may include an error recovery message generating system that generates an error recovery message upon recovery of the error occurred in the shared equipment. In a particular case, the error recovery message generating system may generate the error recovery message by selecting one message from among a plurality of predetermined messages.

According to another aspect of the invention, there is provided a local area network system, which is provided with:
- a plurality of user terminals;
- at least one shared equipment which is shared by said plurality of user terminals, said plurality of user terminals and said at least one shared equipment being interconnected through a local area network; and
- an error recovery notifying system that notifies occurrence of an error in said shared equipment and recovery of the error to said at least a predetermined one of said user terminals when an error occurred and has been recovered.

Since the occurrence and recovery of an error is notified, the user of the predetermined user terminal can recognize that an error occurred actually, and then were recovered. Thus, reliability of the LAN system will not be lowered.

Optionally, the error recovery notifying system notifies the occurrence and recovery of the error by transmitting an E-mail message to said at least a predetermined one of said user terminals.

BRIEF DESCRIPTION OF THE DRAWINGS

FIG. 1 is a diagram showing a structure of a LAN system embodying the present invention;

DESCRIPTION OF THE PREFERRED EMBODIMENTS

Figure 2A:
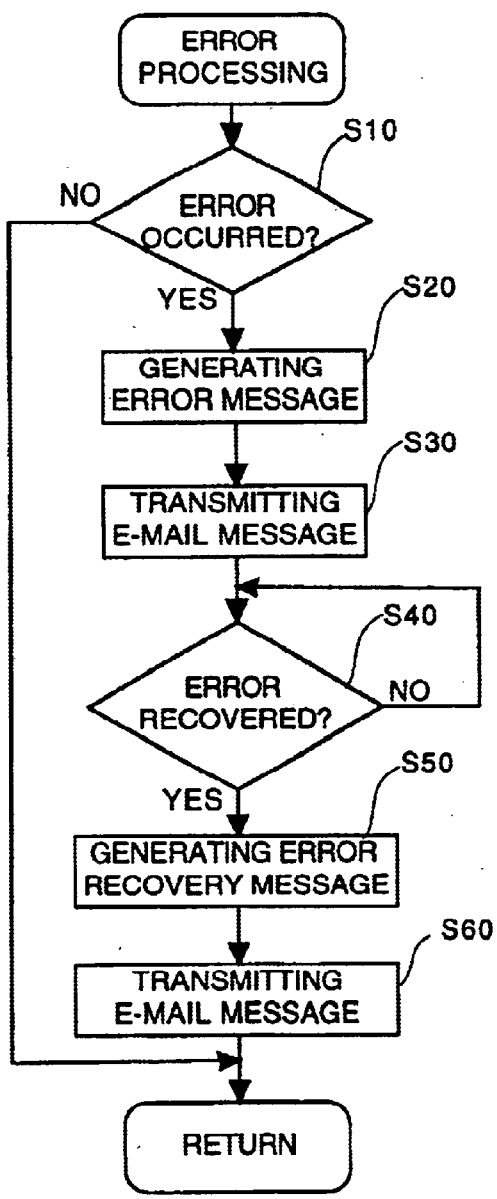
FIG. 2A is a flowchart illustrating an error processing.

FIG. 1 shows a structure of a LAN (Local Area Network) system 100 according to an embodiment of the invention. As shown in FIG. 1, the LAN system includes:
- a plurality of user terminals 10, 11, 12, 13, . . . to which E-mail addresses are assigned, respectively;
- an internet facsimile machine 20 which is shared by the user terminals 10, 11, 12, 13, . . . ;
- a mail server 30 which stores E-mail messages for the users; and
- a LAN cable 40 which interconnects the user terminals 10, 11, 12, 13, . . . the internet facsimile 20, and the mail server 30 to each other.

Each of the user terminals 10, 11, 12, 13, . . . can communicate with external devices/networks via an internet 50 to which the LAN system 100 is connected. In this embodiment, a user of the user terminal 10 is a maintenance manager, who maintains the internet facsimile 20, and the terminal 10 is a maintenance manager's terminal which has a particular function (described later). In the embodiment, the user terminals 10, 11, 12, 13, . . . are personal computers, each of which is provided with peripheral equipment such as a keyboard, a display, a mouse, and the like.

The internet facsimile machine 20 is capable of notifying results of receipt and/or transmission of facsimile messages by sending E-mail messages addressed to receivers and/or senders of the facsimile messages based on receiver identifier data and/or internet addresses of the user terminals 10, 11, 12, . . . . Thus, by monitoring the mail server 30 through a user terminal 10 (11, 12, 13 or 14, . . . ), a user can recognize the receipt of facsimile messages as well as E-mail messages from the external and/or the inside of the LAN system 100.

If an error such as shortage of paper, paper jam, and the like occurs in the internet facsimile machine 20, the maintenance manager should go to the internet facsimile 20 to recover the error.

In order to have the maintenance manager recognize the error of the internet facsimile machine 20, the internet facsimile machine 20 has a function to notify an error to the maintenance manager by sending an E-mail message to the terminal 10.

The internet facsimile machine 20 is provided with, as shown in FIG. 1, a CPU (Central Processing Unit) 25. As shown in FIG. 2A, the CPU 25 of the internet facsimile machine 20 regularly checks whether an error occurred (S10) in the internet facsimile machine 20. When an error has occurred (S10: YES), the CPU 25 generates an error message (S20).

Figure 2B:
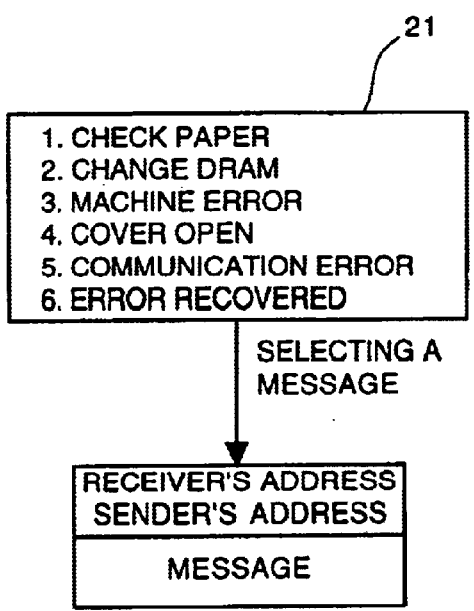
FIG. 2B shows a procedure of a generation of an error message and/or an error recovery message.

A procedure for generating an error message is illustrated in FIG. 2B. As shown in FIG. 2B, the CPU 25 of the internet facsimile machine 20 selects a message corresponding to an occurred error from among messages stored in a message storage area 21 which is formed in a ROM (Read only Memory) 26 provided in the internet facsimile machine 20. Then, the CPU 25 generates an E-mail message including the selected message, and header information including the maintenance manager's address as the receiver and the internet facsimile machine's address as the sender's address. Then, the CPU 25 transmits the Email message (i.e., the terminal 10) to the maintenance manager's address through the LAN system 100 (S30). It should be noted that the maintenance manager's address has been written in the ROM 26 provided in the internet facsimile machine 20. In the procedure described above, the error message is stored as an E-mail message in a maintenance manager's mail box in the mail server 30.

After the error message has been transmitted from the internet facsimile machine 20 to the maintenance manager (i.e., the terminal 10), the CPU 25 checks whether the error has been recovered (S40). It should be noted that, once the internet facsimile machine 20 transmits an error message, the operation thereof is terminated (S40: NO) until the error is recovered. If it is confirmed that the error has been recovered (S40: YES), the CPU 25 of the internet facsimile machine 20 selects a message indicating the recovery of the error from among the messages stored in the message storage area 21, generates an E-mail message including the error recovery message, and header information including the maintenance manager's address as the receiver and the internet facsimile's address as the sender's address (S50). Generation of the error recovery message is done similarly to the generation of the error message except that, when the error recovery message is generated, a message "ERROR RECOVERED" is selected from the messages stored in the message storage area 21. After the error recovery message is generated, the CPU 25 transmits the E-mail message (i.e., the error recovery message) through the LAN system 100 (S60). Thus, the error recovery message is stored as an E-mail message in the maintenance manager's mail box in the mail server 30.

If no errors have occurred (S10: NO), the CPU 25 skips steps for generating and sending the E-mail messages (i.e., steps S20 through S60) and exits the ERROR PROCESSING immediately.

Figure 3:
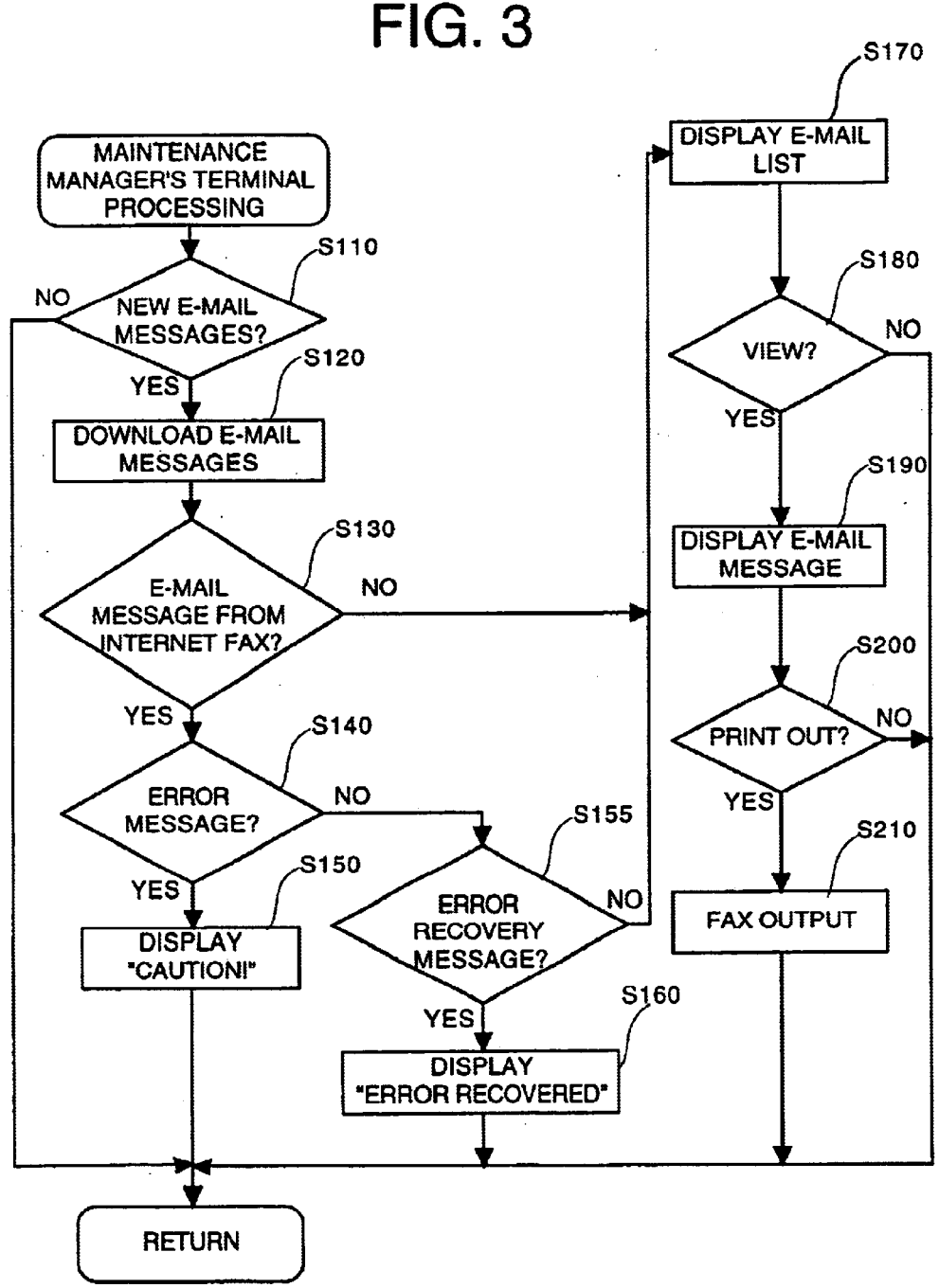
FIG. 3 is a flow chart showing a procedure of observing and displaying E-mail messages regularly performed on the maintenance manager's terminal.
Figure 4A:
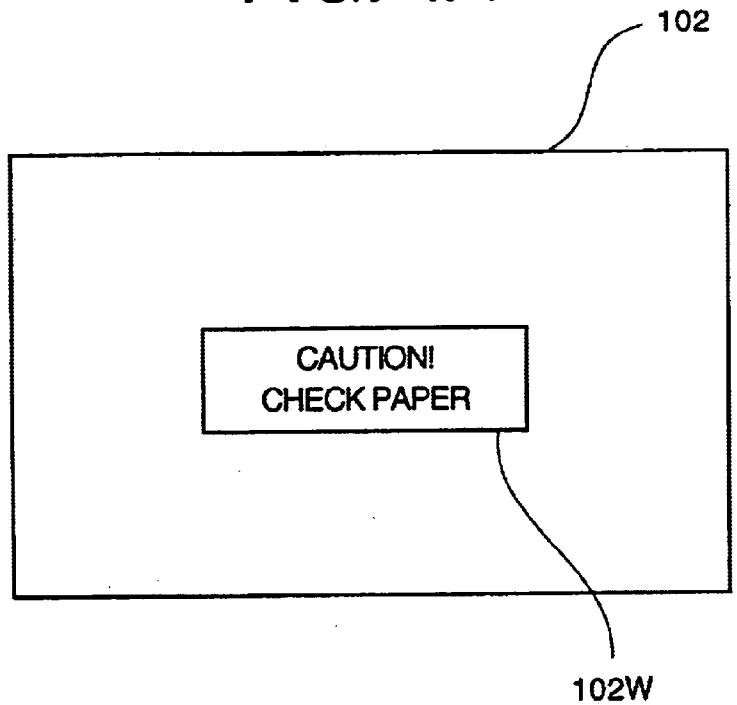
FIGS. 4A and 4B show examples of an error message and an error recovery message.
Figure 4B:
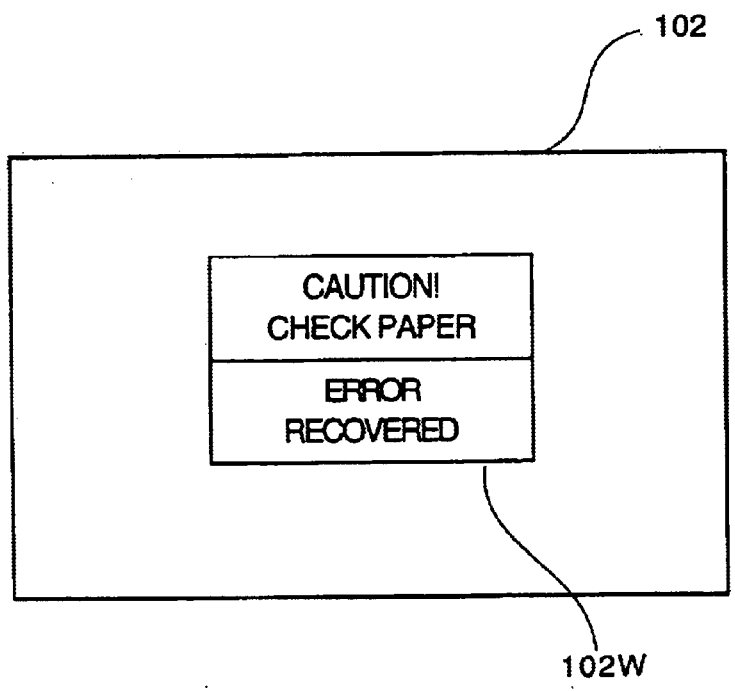

In the maintenance manager's terminal 10, a procedure shown in FIG. 3 is regularly (i.e., periodically) performed. As shown in FIG. 1, the terminal 10 includes a CPU 101, and the procedure shown in FIG. 3 is performed by the CPU 101. At first, the CPU 101 of the maintenance manager's terminal 10 confirms whether there is an arrival of new E-mail messages addressed to the maintenance manager (S11). If there is a new E-mail message, the CPU 101 downloads the E-mail messages (S120) from the mail server 30 and store the E-mail message in a data storage connected to the maintenance manager's terminal 10, and determines whether the sender of the E-mail message is the internet facsimile machine 20 or not (S130). If the sender of the E-mail message is the internet facsimile machine 20 (S130: YES), it further determines whether the E-mail message is an error message (S140). If the E-mail message is an error message (S140: YES), the CPU 101 immediately opens an error message window (in which a character string: "CAUTION!" is displayed) 102W on a display 102 thereof (see FIGS. 1 and 4A), in order to draw the maintenance manager's attention (S150). Optionally, a beep may be made along with display of the error message.

If the E-mail message sent by the internet facsimile machine 20 is an error recovery massage (S140: NO; S155: YES), the maintenance manager's terminal 10 displays a message, e.g., "ERROR RECOVERED" within the error message window 102W corresponding to the recovered error (S160). That is, when the error recovery message is displayed, the occurrence of an error and the recovery of the error are displayed in the same window. Therefore, the maintenance manager is capable of recognizing a type of the occurred error and recovery thereof by viewing a single message window. This feature is convenient especially when a plurality of errors occurred and part of them have been recovered and the remaining errors are not recovered. Further, since a type of the error occurred and recovered can be recognized from a single message window, it is useful for maintaining the internet facsimile machine 20. Optionally, a beep may also be made along with display of the error recovery message.

If an E-mail message, transmitted from the internet facsimile machine 20 to the maintenance manager, is not an error message or an error recovery message (S140: NO, S155: NO), process goes to step S170, in which a list of newly arrived E-mail messages are displayed on the display 102.

If the sender of the E-mail message is not the internet facsimile machine 20 (S130: NO), the maintenance manager's terminal 10 displays the E-mail list of newly arrived E-mail messages on the display thereof (S170). If a command to open the E-mail messages is made (S180: YES), a viewer installed in the maintenance manager's terminal 10 displays the contents of the E-mail messages (S190). Further, if a command to print out the contents of the E-mail messages is made (S200: YES), the contents are printed by the internet facsimile machine 20 which is capable of functioning as a printer (S210). If the maintenance manager does not intend to view or print the E-mail messages, i.e., if it is decided to be NO in step S180 or S200, control exits the procedure shown in FIG. 3.

In the embodiments, only the maintenance manager's terminal 10 is constituted to perform the procedure shown in FIG. 3. It may be possible that each or any one of the user terminals 11, 12, 13, . . . may also be constituted to perform the same process as done by the CPU 101 of the maintenance manager's terminal 10.

Furthermore, the invention can be applied to a LAN system employing other shared equipment such as a printer instead of or in addition to the internet facsimile machine.

The present disclosure relates to the subject matter contained in Japanese Patent Application No. HEI 10-020421, filed on Jan. 16, 1998, which is expressly incorporated herein by reference in its entirety.

What is claimed is:

1. A local area network system, comprising:
   a plurality of user terminals;
   a terminal designating system which designates at least one predetermined one of said plurality of user terminals that excludes the terminal designating system;
   at least one shared equipment which is shared by said plurality of user terminals, said plurality of user terminals and said at least one shared equipment being interconnected through a local area network;
   an error notifying system that notifies occurrence of an error to said at least one predetermined one of said user terminals when the error occurs in said at least one shared equipment; and
   an error recovery notifying system that automatically notifies recovery of the error to said at least one predetermined one of said user terminals when the error is recovered after said error notifying system notified the error to said at least one predetermined one of said user terminals;
   wherein said at least one predetermined one of said user terminals includes:

a display;
a first display system which displays an error message indicating occurrence of the error on said display; and
a second display system which displays an error recovery message indicating recovery of the error on said displays,
wherein said error notifying system includes an error message generating system that generates said error message in accordance with a type of an occurred error, and said error message generating system generates said error message by selecting one message from among a plurality of predetermined messages.

2. The local area network system according to claim 1, wherein each predetermined message of the plurality of predetermined messages includes a type of error occurred and recovered.

3. A local area network system, comprising:
a plurality of user terminals;
a terminal designating system which designates at least one predetermined one of said plurality of user terminals that excludes the terminal designating system;
at least one shared equipment which is shared by said plurality of user terminals, said plurality of user terminals and said at least one shared equipment being interconnected through a local area network;
an error notifying system that transmits a first E-mail message indicating occurrence of an error to said at least one predetermined one of said user terminals when the error occurs in said at least one shared equipment; and
an error recovery notifying system that automatically transmits a second E-mail message indicating recovery of the error to said at least one predetermined one of said user terminals when the error is recovered after said error notifying system transmitted said first E-mail message to said at least one predetermined one of said user terminals;
wherein said at least one predetermined one of said user terminals includes:
a display;
a first display system which displays an error message indicating occurrence of the error on said display; and
a second display system which displays an error recovery message indicating recovery of the error on said displays,
wherein said error notifying system includes an error message generating system that generates said error message in accordance with a type of an occurred error, and said error message generating system generates said error message by selecting one message from among a plurality of predetermined messages.

4. A local area network system comprising:
a plurality of user terminals;
a terminal designating system which designates at least one predetermined one of said plurality of user terminals;
at least one shared equipment which is shared by said plurality of user terminals, said plurality of user terminals and said at least one shared equipment being interconnected through a local area network;
an error notifying system that transmits a first E-mail message indicating occurrence of an error to said at least one predetermined one of said user terminals when the error occurs in said at least one shared equipment;

an error recovery notifying system that automatically transmits a second E-mail message indicating recovery of the error to said at least one predetermined one of said user terminals when the error is recovered after said error notifying system transmitted said first E-mail message to said at least one predetermined one of said user terminals; and
a mail server, and
wherein said at least one predetermined one of said user terminals includes:
a display;
a first display system which displays an error message indicating occurrence of the error on said display; and
a second display system which displays an error recovery message indicating recovery of the error on said display said at least one predetermined one of said user terminals has:
a mail downloading system that regularly checks whether new E-mail messages are arrived in said mail server and downloads newly arrived E-mail messages from said mail server; and
the first display system displays the error message on said display when said first E-mail message is downloaded from said mail server; and
the second display system displays the error recovery message on said display when said second E-mail message is downloaded from said mail server.

5. The local area network system according to claim 4, wherein said first display system displays a message window on said display, said error message being displayed in said message window.

6. The local area network system according to claim 5, wherein said second display system displays said error recovery message in said message window.

7. The local area network system according to claim 4, wherein said error message is included in said first E-mail message.

8. The local area network system according to claim 4, wherein said error recovery message is included in said second E-mail message.

9. A local area network system,
a plurality of user terminals;
a terminal designating system which designates at least one predetermined one of said plurality of user terminals;
at least one shared equipment which is shared by said plurality of user terminals, said plurality of user terminals and said at least one shared equipment being interconnected through a local area network;
an error notifying system that notifies occurrence of an error to said at least one predetermined one of said user terminals when the error occurs in said at least one shared equipment; and
an error recovery notifying system that automatically notifies recovery of the error to said at least one predetermined one of said user terminals when the error is recovered after said error notifying system notified the error to said at least one predetermined one of said user terminals;
wherein said at least one predetermined one of said user terminals includes:
a display;
a first display system which displays an error message indicating occurrence of the error on said display; and a second display system which displays an error recovery message indicating recovery of the error on said display, wherein said local area network is connected to the internet, and wherein said shared equipment is an internet facsimile machine which transmits and receives a facsimile message via the internet, said internet facsimile machine transmits E-mail messages indicating results of transmission and receipt of facsimile messages to respective terminals, said internet facsimile machine being capable of sending first and second E-mail messages.

10. The local area network system according to claim 3, wherein said error notifying system and said error recovery notifying system are provided in said shared equipment.

11. The local area network system according to claim 3, wherein said error recovery notifying system includes an error recovery message generating system that generates said error recovery message upon recovery of the error.

12. The local area network according to claim 11, wherein said error recovery message generating system generates said error recovery message by selecting one message from among a plurality of predetermined messages.

13. The local area network system according to claim 3, wherein each predetermined message of the plurality of predetermined messages includes a type of error occurred and recovered.

14. A local area network system, comprising:

a plurality of user terminals;

a terminal designating system which designates at least one predetermined one of said plurality of user terminals that excludes the terminal designating system;

at least one shared equipment which is shared by said plurality of user terminals, said plurality of user terminals and said at least one shared equipment being interconnected through a local area network;

an error recovery notifying system that automatically notifies occurrence of an error in said shared equipment and recovery of the error to said at least one predetermined one of said user terminals when the error occurred and has been recovered;

wherein said at least one predetermined one of said user terminals includes:

a display;

a first display system which displays an error message indicating occurrence of the error on said display; and a second display system which displays an error recovery message indicating recovery of the error on said display, wherein said error recovery notifying system includes an error message generating system that generates said error message in accordance with a type of an occurred error, and said error message generating system generates said error message by selecting one message from among a plurality of predetermined messages.

15. The local area network system according to claim 14, wherein said error recovery notifying system notifies the occurrence and recovery of the error by transmitting an E-mail message to said at least one predetermined one of said user terminals.

16. The local area network system according to claim 14, wherein each predetermined message of the plurality of predetermined messages includes a type of error occurred and recovered.

\* \* \* \* \*